Sept. 13, 1932.  E. BALDWIN  1,877,638
CAR JOURNAL BEARING
Filed Sept. 11, 1928   2 Sheets-Sheet 1
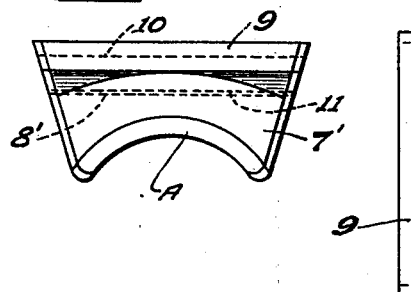
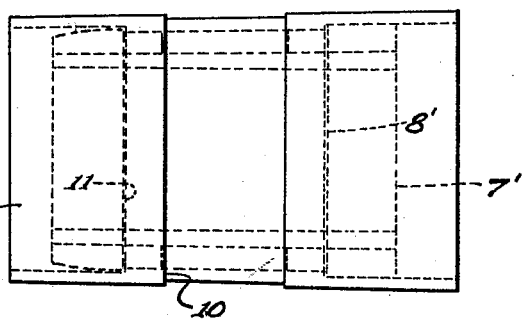
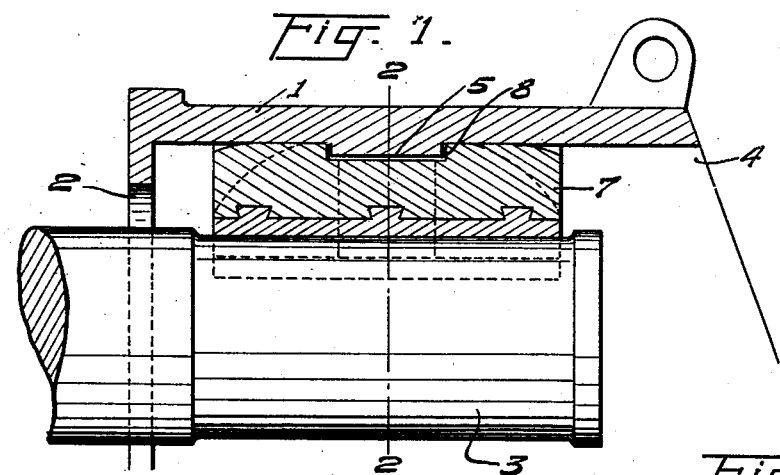
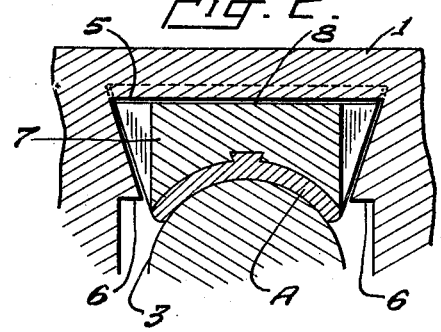
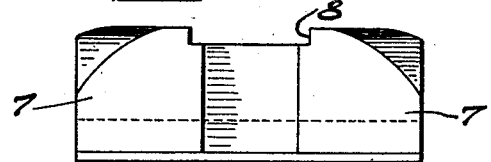
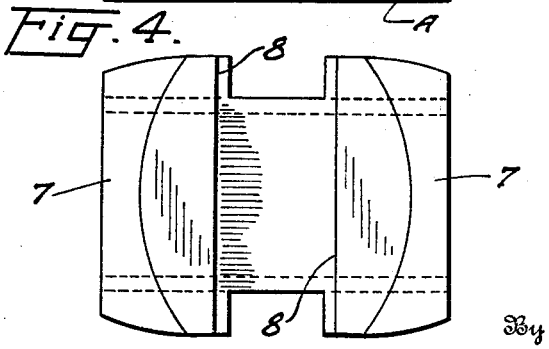
Inventor
EDWARD BALDWIN
By
Attorney Sept. 13, 1932. E. BALDWIN 1,877,638
CAR JOURNAL BEARING
Filed Sept. 11, 1928   2 Sheets-Sheet 2
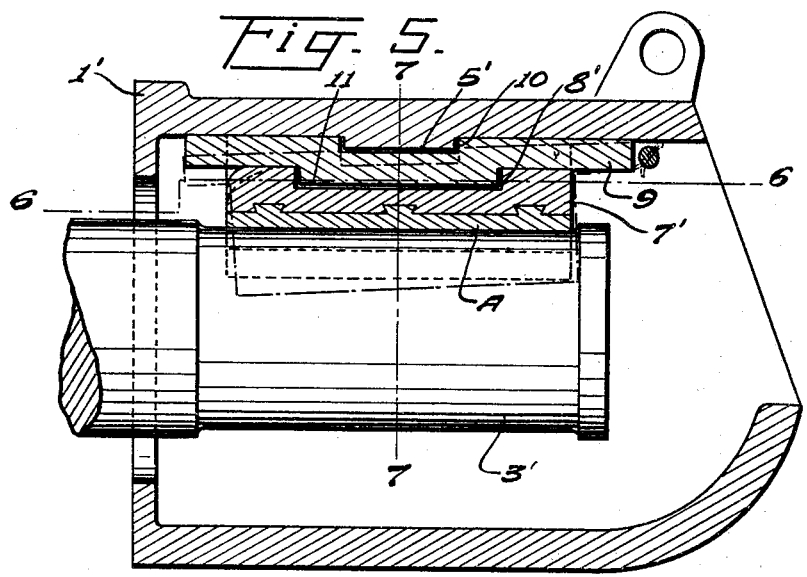
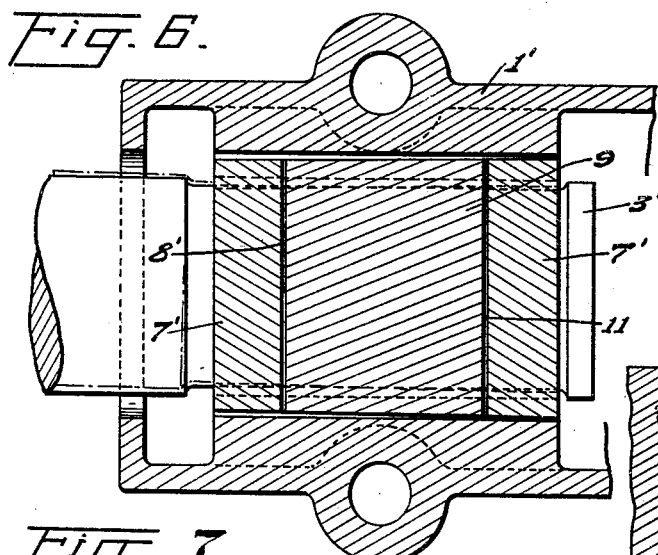
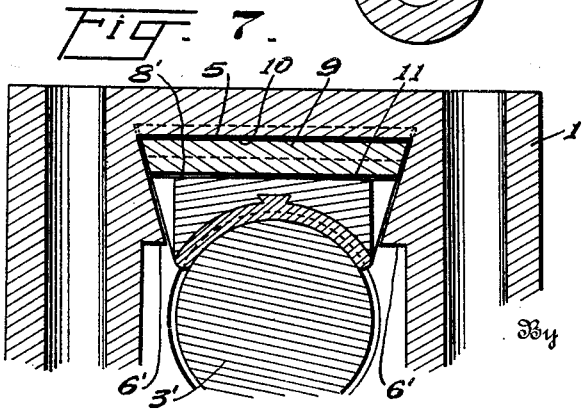
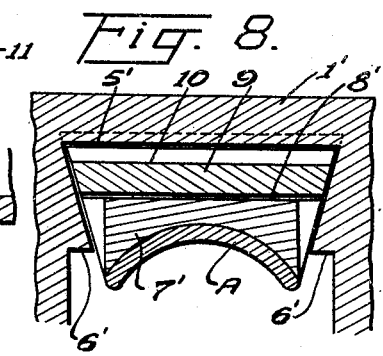
Inventor
EDWARD BALDWIN
By
Attorney Patented Sept. 13, 1932

1,877,638

UNITED STATES PATENT OFFICE

EDWARD BALDWIN, OF NORTH CHARLESTON, SOUTH CAROLINA

CAR JOURNAL BEARING

Application filed September 11, 1928. Serial No. 305,227.

The present invention relates to improvements in car journal bearings, one object of the invention being the provision of a "brass" adapted to be insertable through the outer open end of the box and provided with cooperating means whereby the brass is held against downward displacement to a certain degree, yet permitted slight vertical and sidewise or oscillatory movement to accommodate itself with the journal.

A further object of this invention is the provision of a journal bearing for cars which is adapted either for lumber, freight or passenger cars and which, even though the wheels may leave the track to displace the axle relatively to the box, the brass will be retained relatively within the box, thus overcoming the disadvantage with the present type of brasses in that when any accident occurs tending to lower the journal beyond a certain distance or to break the brass in two pieces, the brass has a tendency to slip and drop to the bottom of the box.

A still further object of this invention is the provision of a car journal bearing which is readily renewed and which has all of the advantages and none of the disadvantages of the present type of journal bearing.

With the foregoing and other objects in view, which will appear as the description proceeds, the invention resides in the combination and arrangements of parts and in the details of construction hereinafter described and claimed, it being understood that changes in the precise embodiment of the invention herein disclosed can be made within the scope of what is claimed without departing from the spirit of the invention.

In the accompanying drawings:—

Figure 1 is a longitudinal sectional view through the upper portion of a lumber car journal box and the present bearing with the journal in elevation, the lid of the box being removed;

Figure 2 is a section taken on line 2—2 of Figure 1;

Figure 3 is a side elevation of the brass per se;

Figure 4 is a side elevation thereof;

Figure 5 is a longitudinal section of a passenger car journal equipped with the present brass;

Figure 6 is a section on line 6—6 of Fig. 5;

Figure 7 is a section on line 7—7 of Fig. 5;

Figure 8 is a cross-section showing the position the feather and brass assume when being initially inserted;

Figure 9 is an end view of the brass and feather per se; and

Figure 10 is a top plan view thereof.

Referring first to Figs. 1 to 4 of the drawings, wherein a journal box and brass embodying my invention and particularly adapted for use on cars not intended for high speed, such as logging cars and mine cars, are shown, 1 designates the journal box having at its inner end the usual circular opening 2, through which an axle journal 3 may be inserted, and having at its opposite end an opening 4 through which lubricant may be placed in the box. The opening 4 is closed by a cover (not shown) as usual in car journal boxes.

The under side of the upper wall of the box 1 is formed with a depending lug 5 which extends transversely of the box. A web 6 of greater length than the width of the lug 5 extends downwardly from the upper wall of the box on the inner face of each side wall of the box. The opposing faces of the webs 6 incline toward one another from the upper wall of the box to their lower ends and together form a dovetailed recess for the reception of the brass 7. The brass 7 is curved on its lower face to fit over the axle journal and has a transverse recess 8 formed in its upper face to receive the lug 5 of the box 1. The opposite side edges of the brass 7 are slightly inclined from the front to the rear end so as to be insertable through the front end of the journal box between the inclined faces of the webs 6, so that, when the brass is being put in place in the dovetail recess formed by the converging faces of the webs 6, the front end is tilted downward slightly as the brass is pushed in and thus passes the lug 5, to permit the final seating of the lug in the recess 8. Thus with the brass so shaped, limited angular movement in a horizontal plane of the axis of the axle journal relatively to the longitudinal axis of the box is permitted, and yet the brass is held against falling too far downwardly or entirely out of the box should the axle be removed.

When the brass is in proper position, the seating of the lug 5 of the box in the transverse groove 8 of the brass will hold the brass against movement longitudinally of the box and the engagement of the inclined faces of the webs 6 with the inclined side edges of the brass will hold the brass against rotation with the axle journal yet permit slight oscillatory movement of the brass. In the event that the car is turned over on its side or upside down so that the axle journal is permitted to move out of contact with the lower face of the brass, as frequently happens in the case of log cars, the engagement of the inclined faces of the webs 6, with the inclined side edges of the brass will prevent the brass from falling down into the bottom of the box when the car is righted. In the event that the brass should wear through from its curved lower surface to its upper surface, and thus break into two parts, such two parts would be spread apart toward the inclined faces of the webs 6 and the engagement of such inclined faces with the inclined side edges of the two parts of the brass will prevent the two parts of the brass from falling down into the bottom of the box.

The curved lower face of the brass may have a facing of anti-friction metal A such as is usually provided in journal brasses of this character.

A journal box 1', axle 3' and brass 7' embodying my invention and suitable for use in cars which travel at high speed, such as passenger and freight cars, is shown in Figures 5 to 10, inclusive.

In this embodiment of the invention, a feather 9 is interposed between the brass and the lower surface of the top of the box. The feather 9 has a transverse depression 10 in its upper surface between its opposite ends, to receive a lug 5' depending from the lower surface of the top of the box 1' and also has a transverse lug 11 depending from its lower surface between its opposite ends to fit in recess 8' of the brass 7'. The side edges of the feather are inclined toward one another from its upper to its lower surfaces. A web 6' of substantially the same length as the feather 9 extends downwardly from the lower surface of the top of the box 1' and the inner face of each side wall of the box. The opposed faces of the webs 6' are inclined toward one another from the upper wall of the box toward their lower ends to form a dovetail recess as in the previous construction.

From the foregoing description, it is evident that with the present type of brass and the peculiar coacting construction of the box, the present brass is readily insertable within the box, and although permitted a slight oscillatory movement to accommodate itself to the journal and the movements thereof during traffic conditions, the same will be held in place should the journal be too far separated therefrom or be removed from the box by any cause whatsoever, and the brass will be in its normal journal-engaging position at all times and even should it be broken into two pieces.

It is also evident that with this peculiar arrangement the brasses can be quickly and easily renewed.

I claim:—

1. The combination with a car journal and a journal box, said box being provided with a substantially dovetail-shaped in cross-section recess adjacent the top thereof and with a relatively wide flat abutment centrally of the top thereof, of a bearing member substantially dovetail-shaped in cross-section slidably mounted within the recess of said box and provided with a recess of slightly greater width than and for accommodating said abutment, said bearing member being tapered and slightly smaller than the dovetail-shaped recess to permit slight vertical and sidewise movement between the bearing member and the recess and thereby the easy insertion of the bearing member with the box.

2. The combination with a car journal and a journal box, said box being provided with a recess substantially dovetail-shaped in cross-section adjacent the top thereof and with an abutment centrally of the top thereof, of a bearing member substantially dovetail-shaped in cross-section slidably mounted within the recess of said box and provided with a recess for accommodating said abutment, said bearing member being tapered and slightly smaller than the dovetail-shaped recess to permit slight vertical and sidewise movement between the bearing member and the recess, and means carried by the box for limiting the longitudinal movement of the bearing member.

3. A car journal box having a recess in its top substantially dovetail-shaped in cross section and provided with a transversely disposed intermediate abutment, and a brass substantially dove-tail-shaped in cross section and provided with a centrally disposed transverse external groove fitting upon the abutment and acting therewith to hold the brass within the box, yet permitting slight movement of the brass to accommodate the movement of the journal.

4. A car journal box having a recess in its top dovetail-shaped in cross section and provided with a transversely disposed intermediate abutment, a feather consisting of a plate provided with a transverse groove to loosely fit said abutment upon its upper face and an abutment upon its lower face below and of greater width than the recess, and a brass substantially dovetail-shaped in cross section and provided with a centrally disposed transverse external groove fitting over the abutment of the feather to form an interlocking member with the feather.

In testimony whereof I have hereunto set my hand.

EDWARD BALDWIN.